United States Patent
King et al.

(10) Patent No.: US 7,650,600 B2
(45) Date of Patent: Jan. 19, 2010

(54) UNIQUE IDENTIFIER RESOLUTION INTERFACES FOR LIGHTWEIGHT RUNTIME IDENTITY

(75) Inventors: Christopher E. King, Redmond, WA (US); Dario Russi, Austin, TX (US); Joel D. Pobar, Redmond, WA (US); Yiru Tang, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 909 days.

(21) Appl. No.: 11/157,401

(22) Filed: Jun. 20, 2005

(65) Prior Publication Data

US 2006/0288353 A1    Dec. 21, 2006

(51) Int. Cl.
*G06F 9/45* (2006.01)
*G06F 3/00* (2006.01)

(52) U.S. Cl. .................. 717/148; 717/151; 719/316; 719/332

(58) Field of Classification Search .............. 717/148, 717/151–161; 719/310, 316, 331–332
See application file for complete search history.

(56) References Cited

U.S. PATENT DOCUMENTS

| | | | |
|---|---|---|---|
| 6,263,491 B1 * | 7/2001 | Hunt | 717/130 |
| 6,438,744 B2 * | 8/2002 | Toutonghi et al. | 717/137 |
| 6,574,673 B1 * | 6/2003 | Hari et al. | 719/310 |
| 6,931,642 B1 * | 8/2005 | Hari et al. | 719/310 |
| 6,988,271 B2 * | 1/2006 | Hunt | 719/315 |
| 7,020,750 B2 * | 3/2006 | Thiyagaranjan et al. | 711/141 |
| 7,219,329 B2 * | 5/2007 | Meijer et al. | 717/106 |
| 2003/0212913 A1 * | 11/2003 | Vella | 713/202 |

\* cited by examiner

*Primary Examiner*—Wei Y Zhen
*Assistant Examiner*—Qing Chen
(74) *Attorney, Agent, or Firm*—Workman Nydegger (57) ABSTRACT

The present invention extends the reflection feature found in some virtual machines or code execution managers by providing interface mechanisms that expose unique identifiers, e.g., metadata tokens and runtime handles. These interfaces are further configured to resolve these unique identifiers to their respective member info or data structures, and vise versa. These unique identifiers remove the element of string binding/resolution, giving them more performance oriented approach to such things as the late-bound reflection/invocation found in the heavyweight features of reflection processes. In addition, these lightweight identifiers allow for enhanced performance and work set when used in analyzing the functionality associated with the corresponding member.

18 Claims, 3 Drawing Sheets

UNIQUE IDENTIFIER RESOLUTION INTERFACES FOR LIGHTWEIGHT RUNTIME IDENTITY

CROSS-REFERENCE TO RELATED APPLICATIONS

N/A

BACKGROUND

Computing technology has transformed the way we work and play. Computing systems now take on a wide variety of forms including desktop computers, laptop computers, tablet PCs, Personal Digital Assistance (PDAs), household devices and the like. In its most basic form, a computing system includes system memory and one or more processors. Software in the system memory may be executed by the processors to direct the other hardware of the computing system to perform desired functions.

Software is created by human programmers most often using source code. Source code includes language and symbols that are relatively intuitive to a human programmer. Source code, however, is not directly interpretable by a processor. Accordingly, in order to obtain functioning software, the source code needs to be compiled or otherwise converted to machine code, i.e., binary instructions. The binary instructions can then be loaded and executed to directly instruct the processor on what specific actions are to be preformed in order to enable the functionality of the software.

Software is becoming more and more complex as time progresses. It is not at all unusual for an application to contain many thousands, and even millions, of distinct binary instructions. This rapid advancement in software development is enabled largely by what is commonly referred to as "object oriented" or "attribute-based" programming. Once a component or object is built that performs a particular lower level task, the functionality of that component may be incorporated into many different applications, even if the higher level functionality of the applications are quite different. Accordingly, a component or object becomes a discrete set of computer-executable instructions that, when executed, implement one or more of the functions. The component may be called by other software components or applications and thus provides a programmer access to a wide variety of components that they may incorporate into an application by placing a function call that properly interfaces with the component.

This model of object oriented programming provides a great deal of flexibility in the behavior of a program not traditionally possible when source code is compiled directly into machine code. For example, custom attributes add metadata to give members extra information that extends the definition of a data type's behavior. The attribute values are determined by a programmer at design time, and can be reconfigured at runtime by users and other programs without the need for code changes or recompilation. In fact, more and more programmers are turning to managed languages that utilize a virtual machine (e.g., in a Common Language Runtime CLR environment) to load and parse through intermediate executable instructions and metadata, thereby forming a layer of abstraction between the file format and in memory runtime representations of an object. This general trend has also motivated programmers to move to an even more extensible and flexible model known as scripting, which allows the source code to be dynamically compiled at runtime without the need for an intermediate language on disk.

With the growing popularity of managed code and dynamic compilation, it is often desirable to provide a reflection feature that allows an application or developer to reflect on portions of an application at runtime. These reflection application program interfaces (APIs) allow for such things as: determining the members of an object; getting information about a member's types, fields, methods, constructors, attributes, etc.; finding out what constants and method declarations belong to an interface; creating an instance of a member whose name is not known until runtime; and many other functions. In essence, reflections allow applications to query metadata, to load types and code, understand the surrounding members, make some decisions about them, and execute-all within the safety of the managed runtime.

Although these reflection features provide a great deal of functionality, they still have several deficiencies and drawbacks. For example, reflection can be divided up into two basic functions: getting static information about a member (inspection) and invocation on a member (execution). There are generally two places that reflection APIs look to get information about a member (i.e., a type, method, field, property, event, attribute, constructor, etc.) to create managed data, these include: metadata, and runtime data structures. Metadata is a typically an "on disk" or file format set of tables that describe members and the entities or elements contained in those members. Runtime data structures, on the other hand, typically only require information from the metadata that is constantly and consistently referenced by runtime services (e.g., just-in-time (JIT) compilation, security checks, etc.). A code execution manager or virtual machine will lazily populate the data structures with information from metadata to get the currently executing job done. As such, the information within the runtime data structures is usually a different and more compact subset of the metadata in file format or on disk.

In order to create a member info, reflection must use both the metadata and the runtime data structures. Touching any sort of metadata on disk, however, is expensive, and slows the overall performance of the system. Further, reflection typically has a very strict policy when it comes to caching members. As such, member info caches that are built in the managed part of the virtual machine simply consume more and more unmanaged memory and resources as more members are reflected upon and unnecessary information from parts of the member info structure that are never needed are continually stored. In addition, the reflection member info cache is never reclaimed. Accordingly, the more members that are reflected on, the bigger the cache grows even if an application is done with the reflection feature.

Another drawback of current reflection mechanisms also lies in the invocation of a member. Within the invocation domain, there are essentially early, late, and hybrid bound invocations. Early-bound calls are emitted by the compiler, whereas late-bound and hybrid calls are, at least partially, performed and analyzed at runtime instead of compile time. As such, it's easy to see that early-bound cases are significantly faster than their late-bound and hybrid counter parts. This is due to the fact that the late-bound and hybrid cases typically have several functions that must be performed during the runtime execution. For example, when invoking a member, the virtual machine must figure out the exact member to invoke using a string input, and perform checks to make sure the invocation is safe. Since a string is used to determine the member, the binding logic alone is expensive and can lead to collisions in names. Further, reflection uses the member info to compare against other member infos when determining if a member is safe to invoke. As such, the drawbacks described above regarding performance and working sets is additionally compounded when multiple comparisons are needed.

SUMMARY

The above-identified deficiencies and drawbacks of current managed computing systems are overcome through exemplary embodiments. Please note that the summary is provided to introduce a selection of concepts in a simplified form that are further described below in the detail description. This summary is not intended to identify key features or essential features of the claimed subject matter, nor is it intended to be used as an aid in determining the scope of the claimed subject matter.

In one embodiment, methods, systems, and computer program products are provided that expose a unique identifier from unmanaged code for providing a reflection type mechanism, without heavyweight functions that unnecessarily impede system performance and working sets. By resolving lightweight unique identifiers to their respective file format representation, runtime representation, or both, the gap between the file format and in memory representations is bridged.

More specifically, a unique identifier corresponding to a member of an object for a program application is determined. Also, a runtime representation of the member, in memory member info representing file format metadata for the member, or both, is determined. Note that the file format metadata for the member and the runtime representation of the member are used to create the member info, and the runtime representation is a data structure that includes one or more elements used at runtime to execute the member. Next, the unique identifier is mapped to the runtime representation, the member info, or both, such that the unique identifier can be used to identify at least a portion of the runtime representation, member info, or both, and the runtime representation, member info, or both can be used to identify the unique identifier. The unique identifier may then be used to analyze aspects of the runtime representation, the member info, or both.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

The present invention extends to methods, systems, and computer program products for exposing unique identifiers that can be resolved to their corresponding member info or runtime representation, and back, for analysis purposes. The embodiments of the present invention may comprise a special purpose or general-purpose computer including various computer hardware or modules, as discussed in greater detail below.

Prior to discussing exemplary embodiments of the present invention in great detail, it will be useful to define some terms used throughout the rest of the application. First, a "member" is used as the base term to describe an object in terms of elements it's composed of, e.g., type, method, fields, properties, attributes, events, constructors, etc. "Member metadata" is a file format representation that describes each of the elements associated with a member, and is typically stored in tables throughout the disk.

The member metadata and runtime data structures can be used to generate "member info," which will typically be an in memory representation of at least a portion of the member metadata. Member info, in turn, may be used by applications to analyze, load, or otherwise execute the member.

A "virtual machine" or "code execution manager" (e.g., CLR) typically manages the execution of program code and uses the above member data and other logic to provide services such as memory and exception management, debugging and profiling, and security. The present invention extends the reflection feature found in some code execution managers by providing interface mechanisms that expose unique identifiers (e.g., metadata tokens and runtime handles). These interfaces are further configured to resolve the unique identifiers to their respective member info or data structures, and vise versa. These unique identifiers remove the element of string binding/resolution, giving them more performance oriented approach to such things as the late-bound reflection/invocation discussed above.

Prior to describing further details for various embodiments of the present invention, a suitable computing architecture that may be used to implement the principles of the present invention will be described with respect to FIG. 3. In the description that follows, embodiments of the invention are described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains them at locations in the memory system of the computer, which reconfigures or otherwise alters the operation of the computer in a manner well understood by those skilled in the art. The data structures where data are maintained are physical locations of the memory that have particular properties defined by the format of the data. However, while the principles of the invention are being described in the foregoing context, it is not meant to be limiting as those of skill in the art will appreciate that several of the acts and operations described hereinafter may also be implemented in hardware.

Turning to the drawings, wherein like reference numerals refer to like elements, the principles of the present invention are illustrated as being implemented in a suitable computing environment. The following description is based on illustrated embodiments of the invention and should not be taken as limiting the invention with regard to alternative embodiments that are not explicitly described herein.

Figure 3:
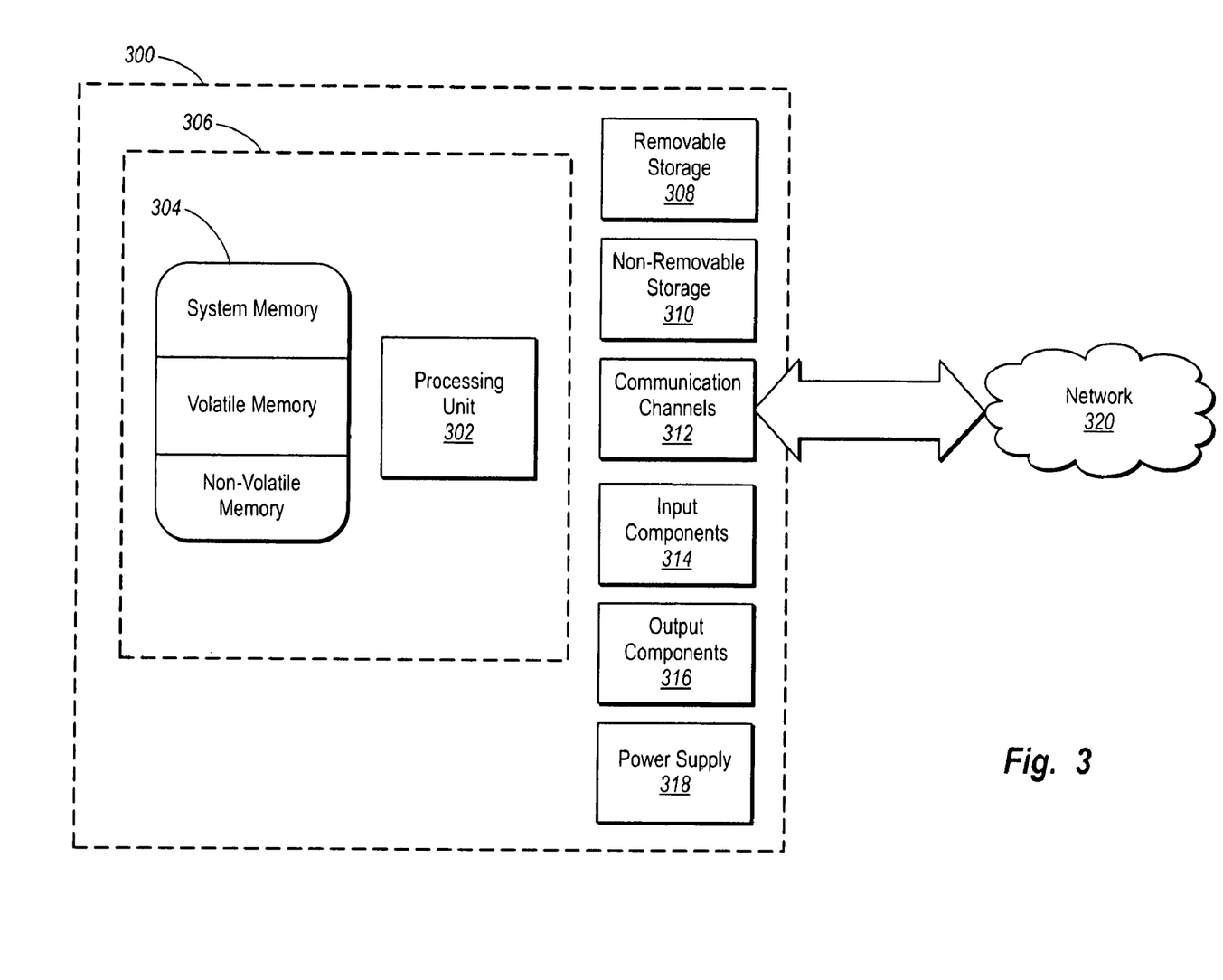
FIG. 3 illustrates an example computing system that provides a suitable operating environment for implementing various features of the present invention.

FIG. 3 shows a schematic diagram of an example computer architecture usable for these devices. For descriptive purposes, the architecture portrayed is only one example of a suitable environment and is not intended to suggest any limitation as to the scope of use or functionality of the invention. Neither should the computing systems be interpreted as having any dependency or requirement relating to any one or combination of components illustrated in FIG. 3.

The principles of the present invention are operational with numerous other general-purpose or special-purpose computing or communications environments or configurations. Examples of well known computing systems, environments, and configurations suitable for use with the invention include, but are not limited to, mobile telephones, pocket computers, personal computers, servers, multiprocessor systems, microprocessor-based systems, minicomputers, mainframe computers, and distributed computing environments that include any of the above systems or devices.

Figure 1:
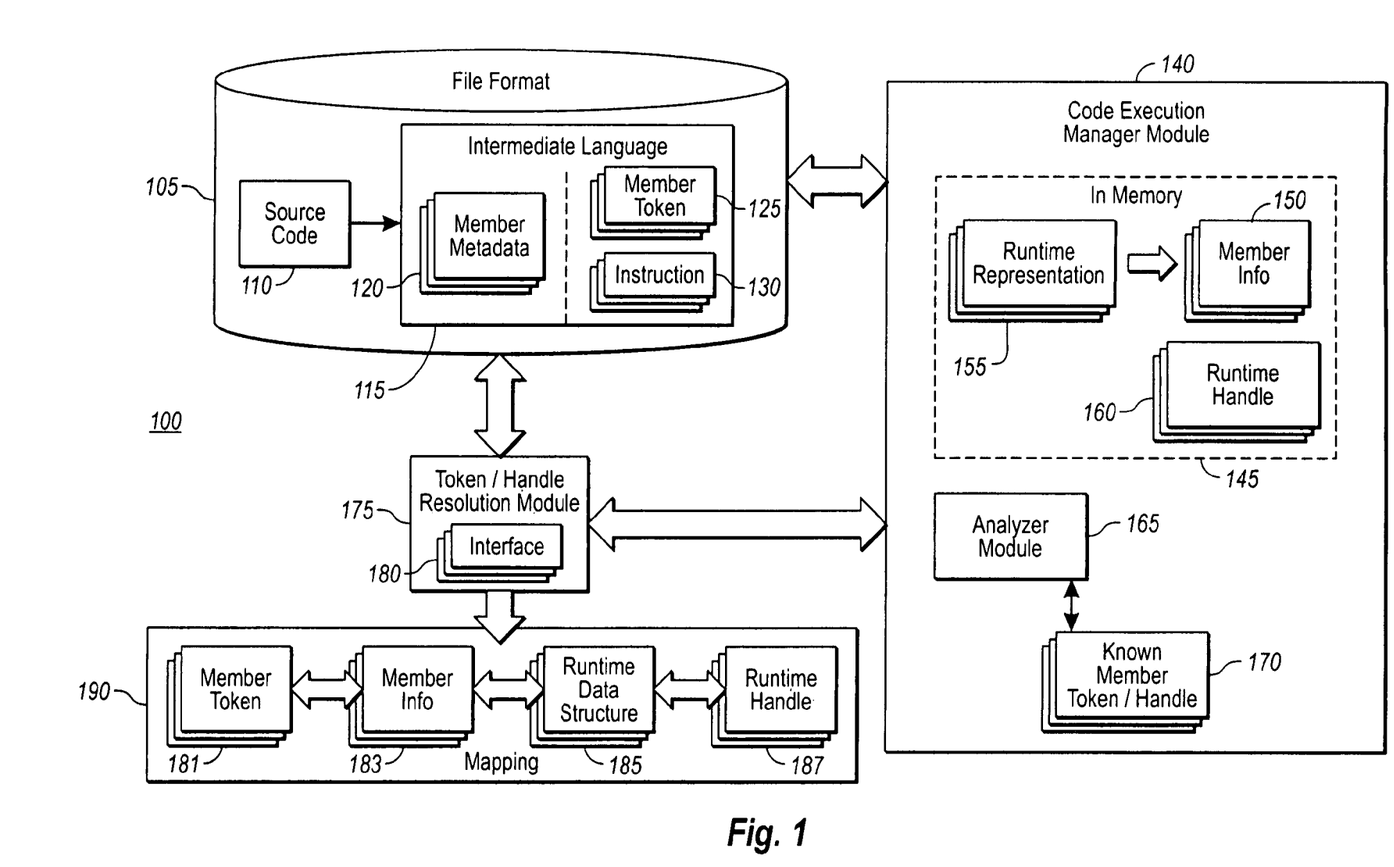
FIG. 1 illustrates a computing system configured to resolve unique identifiers to their respective file format and runtime equivalents in accordance with exemplary embodiments.

In its most basic configuration, a computing system 300 typically includes at least one processing unit 302 and memory 304. The memory 304 may be volatile (such as RAM), non-volatile (such as ROM, flash memory, etc.), or some combination of the two. This most basic configuration is illustrated in FIG. 1 by the dashed line 106. In to this description and in the claims, a "computing system" is defined as any hardware component or combination of hardware components capable of executing software, firmware or microcode to perform a function. The computing system may even be distributed to accomplish a distributed function.

The storage media devices may have additional features and functionality. For example, they may include additional storage (removable and non-removable) including, but not limited to, PCMCIA cards, magnetic and optical disks, and magnetic tape. Such additional storage is illustrated in FIG. 3 by removable storage 108 and non-removable storage 310. Computer-storage media include volatile and non-volatile, removable and non-removable media implemented in any method or technology for storage of information such as computer-readable instructions, data structures, program modules, or other data. Memory 304, removable storage 308, and non-removable storage 110 are all examples of computer-storage media. Computer-storage media include, but are not limited to, RAM, ROM, EEPROM, flash memory, other memory technology, CD-ROM, digital versatile disks, other optical storage, magnetic cassettes, magnetic tape, magnetic disk storage, other magnetic storage devices, and any other media that can be used to store the desired information and that can be accessed by the computing system.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in software and hardware or hardware are also possible and contemplated. In this description, a "computing entity" may be any computing system as previously defined herein, or any module or combination of modulates running on a computing system.

Computing system 300 may also contain communication channels 312 that allow the host to communicate with other systems and devices over, for example, network 320. Communication channels 312 are examples of communications media. Communications media typically embody computer-readable instructions, data structures, program modules, or other data. By way of example, and not limitation, communications media include wired media, such as wired networks and direct-wired connections. The term computer-readable media as used herein includes both storage media and communications media.

The computing system 300 may also have input components 314 such as a keyboard, mouse, pen, a voice-input component, a touch-input device, and so forth. Output components 316 include screen displays, speakers, printer, etc., and rendering modules (often called "adapters") for driving them. The computing system 300 has a power supply 318. All these components are well known in the art and need not be discussed at length here.

FIG. 1 illustrates a managed data computing system or virtual machine environment configured to expose unique identifiers from unmanaged code in accordance with exemplary embodiments. The computing system 100 may be similar to the computing system 300 described above with respect to FIG. 3, although that need not be the case. As shown, in managed system 100 there lies a file format 105 and in memory 145 representations for various members of object oriented code. Generally, an appropriate configured compiler can receive source code 110 (e.g., C#, C++, or Visual Basic Source Code), which may compile the source code into language independent portable executables, e.g., intermediate language 115, containing member metadata 120 and intermediate language instructions 130. As previously stated, member metadata 120 describes the types, methods, field, properties, events, constructors, and other attributes defined in the source code. The intermediate language instructions 130 are operation codes that perform operations on portions of the member metadata 120 when a portable executable or intermediate language is executed. Typically, a just-in-time compiler that translates language independent portable executable into machine specific executable code can facilitate the coordination of operation codes and portions of metadata at the time of execution.

Associated with each instruction 130 is a member token 125 that uniquely identifies where in file format 105 the corresponding metadata 120 for the instruction 130 is located. For example, member token 125 may be a byte string that includes a pointer to a table and a row within the table for where member metadata 120 can be accessed. Further, during the runtime execution and/or during reflections runtime handles 160 are generated and stored in memory 145. Note that these member tokens 125, as well as the runtime handles 160, are in unmanaged code. As such, prior to the advent of the interfaces described below, these unique identifiers were not accessible for use within the reflections environment at runtime.

Typically, code execution manager module 140 when executing or otherwise reflecting on intermediate language 115 will use a string to access the member metadata 120 and runtime representation 155 created at assembly load of the member to construct an in memory member info 150 representing the metadata 120 in file format 105. As previously mentioned, the current use of reflections does not associate unique identities with either the runtime representation 155 or the member info 150. As such, the current use of reflections is limited by the previously described drawbacks associated with memory consumption and performance degradation.

Example embodiments, however, provide for a token/handle resolution module 175 with varying interfaces 180 which can expose member tokens 125 and runtime handles 160 for use in uniquely identifying member info 150 and runtime representation 155. As such, code execution manage module 140 can make a request to resolve the metadata token and/or runtime handle 160 to token/handle resolution module 175. Token/handle resolution module 175 identifies the appropriate interface(s), as described below, and can resolve the metadata token 125 and runtime handle 160 to their corresponding member info 150 and runtime data structures 155, and back. As such, the token handle resolution module 175 or other module may map 190 a member token to the corresponding member info, the member info to the runtime data structure, and the runtime structure to the corresponding runtime handle 187. In other words: metadata token 181 can be resolved to member info 183, and back; metadata token 181 can be resolved to runtime data structure 185, and back; and metadata token 181 can be resolved to the runtime handle 187, and back.

Such identity can then be used by analyzer module 165 and/or code execution manager module 140 such that the member token 181 and/or runtime handle 187 can be compared to known member token/handles 170 for various purposes as described in greater detail below. For example, analyzer module 165 can use these unique identifiers 181, 187 to determine rogue or potentially malicious program applications or plug-ins and can also use these to bypass code execution manager modules 140s reflection base cache mechanism.

One underline objective of these token/handle resolution interfaces 180 is to bridge the gap between the file format 105 and in memory 145 representations of a member and the unique identifiers used to point to them. Note that metadata tokens 125 and runtime handles 160 are two forms of strong type and member identity typically found in the unmanaged virtual machine 140. Example embodiments utilize both metadata tokens 125 and runtime handles 160 during runtime to maintain uniqueness. Previously, the only mechanism available to languages and users using managed code was the very heavyweight reflection interface, described above. These new lightweight managed interfaces 180, however, allow languages and users to utilize these unmanaged unique constructs 180 and the identity resolution methods they enable.

The following provides some examples of source code that can be used to expose and resolve unique identifiers in accordance with exemplary embodiments. The following code is not all inclusive and omits various operands and other elements and is written in a generic coded fashion. Accordingly, the following examples in both form and usage of these constructs or interfaces may vary depending upon the particular language and/or platform for which they are used. Further, these interfaces are used herein for illustrative purposes only and are not meant to limit or otherwise narrow the scope of the present invention unless explicitly claimed.

The following example interface provides a hook that allows a code execution manager to obtain a metadata token for a member as a managed data structure:

```
namespace System.Reflection
{
    public class Assembly
    {
        public int MetadataToken { get; }
    }
    public class Module
    {
        public int MetadataToken { get; }
    }
    public class MemberInfo
    {
        public int MetadataToken { get; }
    }
}
```

As shown, metadata tokens are obtained for an assembly, module, and member info, which can then be used for comparing and other analysis purposes during reflections as described herein. Note that there are other metadata token properties on other classes (e.g., type delegator) available. Accordingly, the above-identified metadata tokens for the subclass of properties is used herein for illustrative purposes only and is not meant to limit or otherwise narrow the scope of the present invention.

Similar to the API above for obtaining metadata tokens, the following interface can be used to obtain runtime handles for members as a managed data structures:

```
namespace System.Reflection
{
    public class MethodInfo
    {
        public RuntimeMethodHandle MethodHandle { get; }
    }
    public class FieldInfo
    {
        public RuntimeFieldHandle FieldHandle { get; }
    }
    public class Type
    {
        public RuntimeTypeHandle TypeHandle { get; }
    }
}
```

As shown, the runtime handle is retrieved for the runtime method, runtime field, and runtime type. Typically, as previously mentioned, the runtime handles are resolved to the runtime data structures. Because the data structures are typically a subset of the member info, only the corresponding subset of handles is needed, shown here as a method, field, and type handle. Note, however, that this may not always be the case and that the above subset is used for illustrative purposes only and is not meant to limit or otherwise narrow the scope of the present invention unless explicitly claimed.

Once the metadata token and/or runtime handles are obtained, the following example interfaces may be used to resolve the metadata tokens and/or runtime handles as previously described. Each bold header title indicates the direction of the resolution.

Token to Member Info resolution;

```
namespace System.Reflection
{
    public class Module
    {
        public MethodBase ResolveMethod(int metadataToken);
        public FieldInfo ResolveField(int metadataToken);
        public Type ResolveType(int metadataToken);
        public MemberInfo ResolveMember(int metadataToken);
    }
}
```

Token to Handle resolution;

```
namespace System
{
    public class ModuleHandle
    {
        public RuntimeTypeHandle ResolveTypeHandle(int typeToken);
        public RuntimeMethodHandle ResolveMethodHandle(int methodToken);
        public RuntimeFieldHandle ResolveFieldHandle(int fieldToken);
    }
}
```

Handle to Member Info resolution;

```
namespace System.Reflection
{
 public class MethodBase
 {
     public static MethodBase
   GetMethodFromHandle(RuntimeMethodHandle handle);
 }
 public class FieldInfo
 {
     public static FieldInfo GetFieldFromHandle(RuntimeFieldHandle handle);
 }
}
namespace System
{
 public class Type
 {
     public static extern Type GetTypeFromHandle(RuntimeTypeHandle handle);
 }
}
```

Member Info to Token resolution; and

```
namespace System.Reflection
{
    public abstract class MemberInfo
    {
        public int MetadataToken { get; }
    }
}
```

Member Info to Handle resolution;

```
namespace System.Reflection
{
    public class MethodBase
    {
        public RuntimeMethodHandle MethodHandle { get; }
    }
    public class FieldInfo
    {
        public RuntimeFieldHandle FieldHandle { get; }
    }
    public class Type
    {
        public RuntimeTypeHandle TypeHandle { get; }
    }
}
```

Note that in the above example APIs, there isn't a handle to token resolution interface. This is due to the fact that rarely will it be the case that one would desire to go from handle to a token. Nevertheless, an interface could be constructed to provide for handle to token resolution. Alternatively, of course, the work around is to resolve the runtime handle to the member info, and then resolve the member info to the metadata token.

As previously mentioned, once the metadata token and runtime handles are resolved, example embodiments can use these unique identifiers for performing identity checks by comparing them to other known member token and handle identities. This advantageous feature allows for determining equivalence between member info, runtime representations, or both, without having to invoke the heavyweight features of reflections. Further, this comparison of unique identifiers for analyzing the members in file format and in memory can be used at runtime in making decisions as to whether a member or assembly will be loaded, analyzed, or executed. For example, if functions are identified as having types, methods, or properties known to cause malicious behavior (e.g., cancel, delete files, shut down system, close application, etc.), the unique identifiers for these functions can be compared against other members. If the identities match, it may be determined that a plug-in or other object associated with the member should not be loaded and run.

For the above comparison feature, note that typically metadata tokens will be simple integers, and thus will follow the same basic comparison rules as the primitive "int" type. Handles, on the other hand, may have the following override operators:

```
public static bool operator ==(RuntimeTypeHandle left, object right) {
return left.Equals(right); }
public static bool operator ==(object left, RuntimeTypeHandle right) {
return right.Equals(left); }
public static bool operator !=(RuntimeTypeHandle left, object right) {
return !left.Equals(right); }
public static bool operator !=(object left, RuntimeTypeHandle right) {
return !right.Equals(left); }
```

As can be appreciated, the above described interfaces provide many advantageous features not previously available in the managed systems environment. For example, with an industry transitioning into extensible applications and scenarios enabled by scripting languages, the above interfaces will be an attractive target for implementation of these trends. Thus, including these interfaces in the platform will enable adoption for static language/compile writers, dynamic languages that rely heavily on runtime based identity and resolution, and enterprise level applications with extensibility points that require small working set of footprints and high performance goals.

There are also significant flow effects from enabling innovation in the language and extensibilities base. For example, the more dynamic and scripting based languages that target the platform, the more uses the platform enables, e.g., command lines scripting, application scriptability, game engine artificial intelligence, component glue code, etc. In addition, the more applications that expose an extensibility point, the more opportunity for external vendors to provide plug-ins to those applications—significantly increasing the overall value of an application, and therefore the platform.

In addition to the above advantageous features, by exposing the metadata token and runtime handles, a reflection interface is able to simply check the cache and return the member info or corresponding runtime representation using the token/handle, thus taking only one entry in the reflection cache. Further, there is an enhanced performance in speed due to the work typically required to resolve the member info from a string. Typically, the string should be hashed and requires performing virtual resolution (which requires looking for all other methods with the same name). Using these unique identifiers, however, the system now bypasses virtual resolution and simply returns the method or member. Moreover, if one wants to reduce the work set of an application, the caching metadata token and/or runtime handles should be stored rather then the heavyweight member info and/or runtime representation. Such mechanism is particularly useful when the use or invocation of the member info is only performed on an occasional basis. In addition, because these identifiers are unique, there are no collisions or ambiguities as there are with string names.

Another benefit provided is the ability to bypass the code execution manager reflection base caching mechanisms, and using metadata tokens and runtime handles to build a user specified reflection or identity cache policy. Example embodiments provided by these example interfaces allow a managed code user to bypass the reflection member info cache altogether, and control the instantiation of that cache when a metadata token or handle was resolved to its reflection based member info. For most cases, where all that is needed is a simple handle identity comparison, this significantly improves the performance and working set of an application.

In still another advantageous feature provided by example embodiments, select portions of the metadata can be retrieved without requiring all the information provided in the member metadata 120, member info 150, 183 or runtime representation 155, 185, or runtime representation 155, 185. In other words, because the metadata token 125, 181 is resolved to file format member metadata 120, the member info 150, 183 and runtime representation 155, 185, one can create reflections that parse or obtain information about a subset of the metadata from these file format and in memory representations. This should significantly reduce the amount of metadata held in memory during runtime, thus increasing the work set and enhancing performance even further.

The present invention may also be described in terms of methods comprising functional steps and/or non-functional acts. The following is a description of steps and/or acts that may be preformed in practicing the present invention. Usually, functional steps describe the invention in terms of results that are accomplished whereas non-functional acts describe more specific actions for achieving a particular result. Although the functional steps and/or non-functional acts may be described or claimed in a particular order, the present invention is not necessarily limited to any particular ordering or combination of steps and/or acts. Further, the use of steps and/or acts in the recitation of the claims—and in the following description of the flow diagrams for FIG. 2—is used to indicate the desired specific use of such terms.

Figure 2:
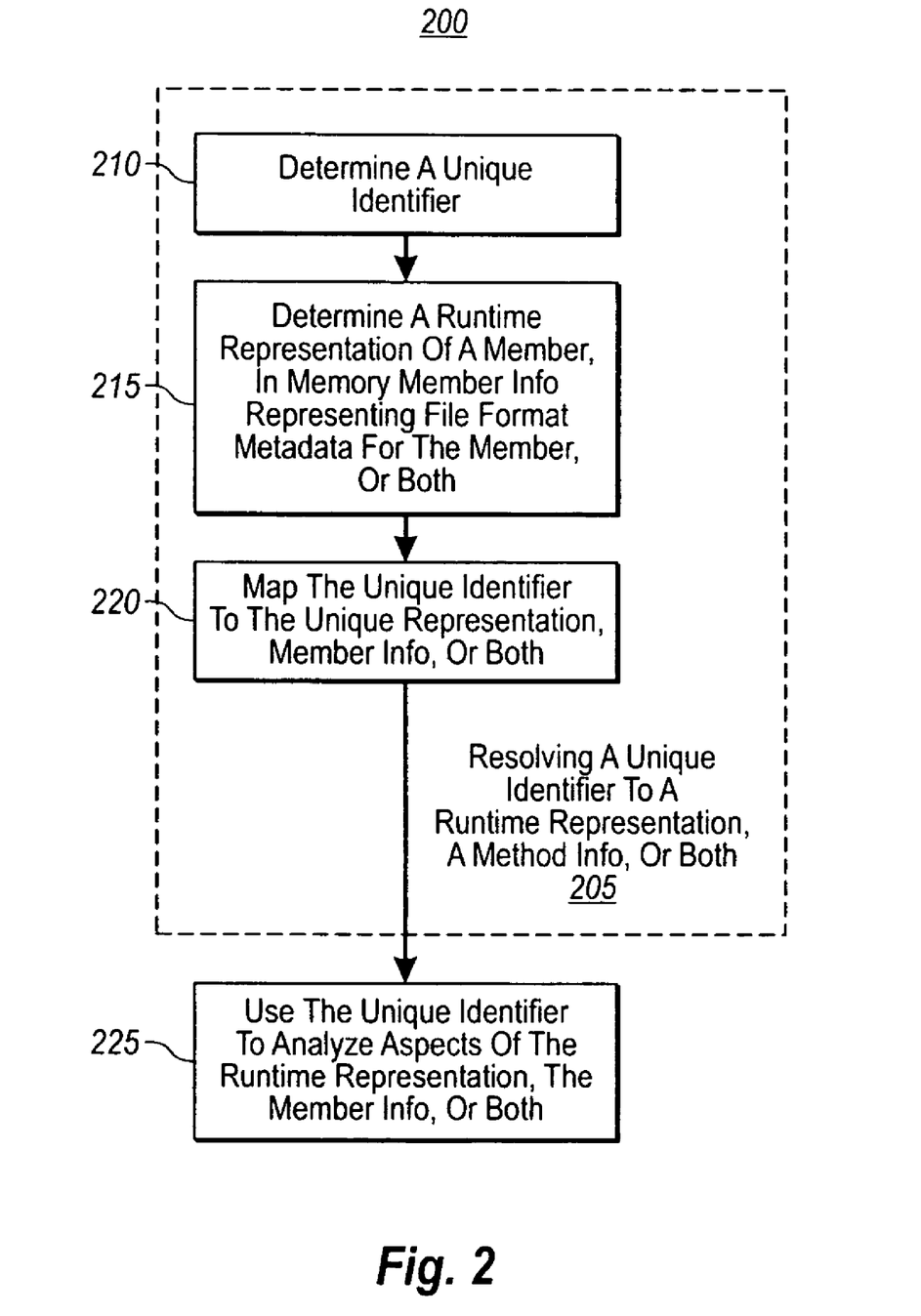
FIG. 2 illustrates a flow diagram of a method of exposing a unique identifier from unmanaged code for providing a reflection type mechanism in accordance with exemplary embodiments.

FIG. 2 illustrates flow diagrams for various exemplary embodiments of the present invention. The following description of FIGS. 2 will occasionally refer to corresponding elements from FIG. 1. Although reference may be made to a specific element from this Figure, such elements are used for illustrative purposes only and are not meant to limit or otherwise narrow the scope of the present invention unless explicitly claimed.

FIG. 2 illustrates a flow diagram for a method 200 of exposing unique identifiers from unmanaged code for providing a reflection type mechanism, without heavyweight functions that unnecessarily impede system performance and work set. By resolving lightweight unique identifiers to their respective file format representations, in memory runtime representations, or both, exemplary embodiments bridge the gap between the file format and in memory representations.

Method 200 includes a step for resolving 205 a unique identifier to a runtime representation, member info, or both. Step for 205 includes an act of determining 210 a unique identifier. The unique identifier may be a member token 125 and/or runtime handle 160 that corresponds to a member of an object for a program application. In the event that the unique identifier is a metadata token, the program application may be in portable executable form, and the metadata token may be part of the intermediate language sequence in file format corresponding to an instruction 130, e.g., a call. Further the unique identifiers 125, 160 may be stored and mapped in a symbol table.

Step for 205 also includes an act of determining 215 a runtime representation of a member, in memory member info representing file format metadata for the member, or both. The file format metadata 120 for the member and the runtime representation 155 of the member are used to create the member info 150, and the runtime representation 155 is a data structure that includes one or more elements used at runtime to execute the member. The member info 150 may include one or more of a type, method, field, property, event, attribute, construct, etc. Further, the runtime representation data structure may be a subset of the information within the metadata and include one or more of a type, method, or field. In addition, the metadata may be stored in one or more rows in one or more tables.

Next, step for 205 includes an act of mapping 220 the unique identifier to the unique representation, member info, or both. Accordingly, the unique identifier 125, 160 can be used to identify at least a portion of the runtime representation 155, member info 150, or both. In turn, the runtime representation 155, member info 160, or both, can be used to identify the unique identifier.

Method 200 further includes an act of using 225 the unique identifier to analyze aspects of the runtime representation, the member info, or both. For example, analyzer module 165 may be used to compare the unique identifier albeit a metadata token 125 or runtime handle 160 to known member of token and runtime handles 170 to determine if the member is potentially malicious or rogue. For example, known unique identifiers for interfaces for closing, quitting, or deleting files, etc. may be compared against the unique identifiers to determine potential harmful plug-ins.

The unique identifiers 125, 160 may be used to access one or more of the file format metadata 120, the runtime representation 155, 185, the metadata info 150, 120, wherein only a portion of the information within these constructs are identified and used for the analysis module 165. The unique identifiers 125, 160 may also be stored as a managed data structure in memory, wherein the member info 150 and/or runtime representation 155 are not persisted in memory 140 in order to allow a user to define cache policies.

Other embodiments provide that the resolution occurs on the fly, and wherein the managed computing system is a dynamic scripting language compiler.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. In a managed computing system including a processor and system memory, a method of exposing unique identifiers of an unmanaged code for providing a reflection type mechanism—without heavyweight functions that unnecessarily impede system performance and working set—by resolving lightweight unique identifiers to their respective file format representation, in memory runtime representation, or both, in order to bridge the gap between the file format and in memory runtime representations, the method comprising acts of:
    determining a unique identifier corresponding to a member of an object for a program application;
    accessing both a runtime representation of the member and an in memory member info representing file format metadata for the member, wherein the file format metadata for the member and the runtime representation of the member are used to create the member, and wherein the runtime representation of the member is a data structure that includes one or more elements used at runtime to execute the member;
    mapping the unique identifier to the runtime representation of the member, the in memory member info, or both, such that the unique identifier can be used to identify at least a portion of the runtime representation of the member, the in memory member info, or both, and the runtime representation of the member, the in memory member info, or both, can be used to identify the unique identifier;
    determining the equivalence between a unique identifier of the runtime representation of the member and a unique identifier of the in memory member info without having to search for member names;
    based on the determination that the unique identifiers are equivalent, comparing the unique identifier corresponding to the member of the object to one or more other known unique identifiers to determine, at runtime, whether the member is malicious and whether the member is to be loaded and run; and
    based on a runtime determination indicating that the member is malicious, bypassing loading and execution of the member.

2. The method of claim 1, wherein the unique identifier is a metadata token, runtime handle, or both.

3. The method of claim 2, wherein the program application is in portable executable form and the metadata token is part of an intermediate language sequence in file format corresponding to an instruction.

4. The method of claim 2, wherein the unique identifier is used to access only a portion of information within the runtime representation of the member, the in memory member info, or both, for the comparison.

5. The method of claim 4, wherein at least a portion of the runtime representation of the member, the in memory member info, or both, are cached based on policies defined by a user.

6. The method of claim 2, wherein the unique identifier is stored as a managed data structure in memory, and wherein the in memory member info, the runtime representation of the member, or both, are not persisted in memory in order to allow a user to define caching policies.

7. In a managed computing system including a processor and a system memory, a method of exposing unique identifiers of an unmanaged code for providing a reflection type mechanism—without heavyweight functions that unnecessarily impede system performance and working set—by resolving lightweight unique identifiers to their respective file format representation, in memory runtime representation, or both, in order to bridge the gap between the file format and in memory runtime representations, the method comprising:
    resolving a unique identifier for a member to both a runtime representation of the member and an in memory member info representing file format metadata for the member, wherein the file format metadata for the member and the runtime representation of the member are used to create the in memory member info, and wherein the runtime representation of the member is a data structure that includes one or more elements used at runtime to execute the member;
    mapping the unique identifier to the runtime representation of the member, the in memory member info, or both, such that the unique identifier can be used to identify at least a portion of the runtime representation of the member, the in memory member info, or both, and the runtime representation of the member, the in memory member info, or both, can be used to identify the unique identifier;
    determining the equivalence between a unique identifier of the runtime representation of the member and a unique identifier of the in memory member info without having to search for member names;
    based on the determination that the unique identifiers are equivalent, comparing the unique identifier for the member to one or more other known unique identifiers to determine, at runtime, whether the member is malicious and whether the member is to be loaded and run; and
    based on a runtime determination indicating that the member is malicious, bypassing loading and execution of the member.

8. The method of claim 7, wherein the unique identifier is a metadata token, runtime handle, or both.

9. The method of claim 8, wherein the in memory member info includes metadata for one or more of a type, method, field, property, event, attribute, or constructs.

10. The method of claim 9, wherein the data structure is a subset of the information within the metadata including one or more of a type, method, or field.

11. The method of claim 7, wherein the resolution occurs on the fly, and wherein the managed computing system is a dynamic scripting language compiler.

12. The method of claim 7, wherein the unique identifier is stored and mapped in a symbol table.

13. The method of claim 7, wherein the file format metadata for the member is stored in one or more rows in one or more tables.

14. In a managed computing system, a computer program product for implementing a method of exposing unique identifiers of an unmanaged code for providing a reflection type mechanism—without heavyweight functions that unnecessarily impede system performance and working set—by resolving lightweight unique identifiers to their respective file format representation, in memory runtime representation, or both, in order to bridge the gap between the file format and in memory runtime representations, the computer program product comprising one or more computer readable storage media having stored thereon computer executable instructions that, when executed by a processor, can cause the managed computing system to perform the following:

- determine a unique identifier corresponding to a member of an object for a program application;
- access both a runtime representation of the member and an in memory member info representing file format metadata for the member, wherein the file format metadata for the member and the runtime representation of the member are used to create the in memory member info, and wherein the runtime representation of the member is a data structure that includes one or more elements used at runtime to execute the member;
- map the unique identifier to all of the following: the runtime representation of the member, the in memory member info, and a runtime handle such that the unique identifier can be used to identify at least a portion of the runtime representation of the member, the in memory member info, and the runtime handle, and wherein any of the runtime representation of the member, the in memory member info, or the runtime handle can be used to identify the unique identifier;
- determine the equivalence between a unique identifier of the runtime representation of the member and a unique identifier of the in memory member info without having to search for member names;
- based on the determination that the unique identifiers are equivalent, compare the unique identifier corresponding to the member of the object to one or more other known unique identifiers to determine, at runtime, whether the member is malicious and whether the member is to be loaded and run; and
- based on a runtime determination indicating that the member is malicious, bypassing bypass loading and execution of the member.

15. The computer program product of claim 14, wherein the unique identifier is a metadata token, runtime handle, or both.

16. The computer program product of claim 15, wherein the program application is in portable executable form and the metadata token is part of an intermediate language sequence in file format corresponding to an instruction.

17. The computer program product of claim 15, wherein the unique identifier is used to access only a portion of information within one or more of the file format metadata for the member, the runtime representation of the member, or the in memory member info, for the comparison.

18. The computer program product of claim 17, wherein at least a portion of the runtime representation of the member, the in memory member info, or both, are cached based on policies defined by a user.

* * * * *